UNITED STATES PATENT OFFICE 2,108,277

REACTING HYDROCARBONS WITH ALKALI METALS

Joseph F. Walker, Niagara Falls, N. Y., assignor to E. I. du Pont de Nemours & Company, Wilmington, Del., a corporation of Delaware No Drawing. Application February 15, 1936,
Serial No. 64,172

17 Claims. (Cl. 260—168)

This invention relates to improvements in the method of effecting the reaction of alkali metals with aromatic hydrocarbons, and more specifically to a method of effecting addition of alkali metals to naphthalene and other polycyclic aromatic hydrocarbons.

It is well known that alkali metals will react with a wide variety of aromatic hydrocarbons under a wide variety of conditions. An extensive review of this work has been published by C. B. Wooster, (Chemical Reviews, vol. XI, pp. 1-91, August 1932). While most of the reactions described have been of little technical significance on account of the cost of the materials involved, there is particular interest in the attempts that have been made to react alkali metals with the cheaper hydrocarbons such as naphthalene. Schlenk (Annalen 463 90—95) carried out slow reactions using lithium in ethyl ether and obtained sufficient reaction in eight days with naphthalene, and in fourteen days with diphenyl, to permit some examination of the products formed. He represented the alkali metal compounds by the formulae,

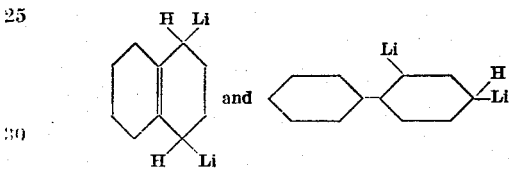

Schlenk, using ethyl ether as solvent, failed to get any detectable reaction of sodium with these hydrocarbons even in months. He attributed this to a poisoning effect on the sodium of minute traces of sulfur compounds present even in the best grades of naphthalene as supplied for a standard for calorimetry.

The reaction of sodium with naphthalene has also been studied to some extent using liquid ammonia as solvent. At ordinary temperatures, the reaction products are sodamide and tetralin. At low temperatures a red solution is obtained which has been shown by Wooster, (J. Am. Chem. Soc. 53: 179-187 (1931)), to be in all probability a monosodium tetralin formed by addition of four atoms of sodium to one molecule of naphthalene, followed by immediate ammonolysis of three atoms of the sodium of sodamide as represented by the equations:

$$C_{10}H_8 + 4Na \rightarrow C_{10}N_8Na_4$$

$$C_{10}H_8Na_4 + 3NH_3 \rightarrow 3NaNH_2 + C_{10}H_{11}Na$$

Because of the large consumption of sodium and the reactivity of the ammonia used as solvent, this method is practically useless as a means of preparing acids or other derivatives from naphthalene.

An object of this invention is to provide a method for causing alkali metals, and specifically sodium, to be added to naphthalene and other polycyclic aromatic hydrocarbons such as anthracene, phenanthrene, acenaphthene, diphenyl, retene, and the like. A further object is to cause this reaction to be carried out at temperatures and under conditions favorable to the stability of the products; a further object is to provide a rapid reaction; my invention also includes the product or products formed by the hereindescribed method, which products are reactive solutions of alkali metal addition compounds of naphthalene and other polycyclic aromatic hydrocarbons. Other objects will appear from the description of the invention.

I have found that certain solvents and classes of solvents have a very specific action in promoting the reaction of alkali metals with naphthalene to form addition products. As stated, the action of these solvents is specific, but I do not know whether their action is catalytic, whether the solvent itself takes part in the reaction in some manner, or whether there are some solubility or other physical factors involved.

The solvents which I have found of such remarkable activity and usefulness for these reactions are broadly in the class of tertiary amino ethers although not all of the members of the group are effective and of the effective ones some are better than others. In U. S. Patents 2,019,-832, 2,023,793 and 2,027,000 it has been shown that certain classes of ethers are effective solvents for these addition reactions. I have now discovered that certain tertiary amino ethers, that is, ethers which contain one or more tertiary amino groups, are excellent solvents for these reactions.

The above mentioned U. S. patents disclose that the following classes of ethers, which are substantially nonreactive with alkali metals or with the addition compounds formed, are effective in promoting the addition of alkali metals to naphthalene and other polycyclic aromatic hydrocarbons when such ethers are used as solvent media for the reactions:

1. Aliphatic monoethers having a $CH_3O$ group and having an oxygen to carbon ratio of not less than 1:4, e. g., dimethyl ether, methyl ethyl ether and methyl propyl ether.

2. Noncyclic polyethers, e. g., ethylene glycol dialkyl ethers, glycerol trialkyl ethers, alkyl orthoformates and the like.

3. Cyclic polyethers, e. g. dioxan.

More generally stated, I have found that the addition reaction is promoted by the presence of any monoether which has a CH₃O-group, a carbon to oxygen ratio not greater than 4:1 and no aryl group attached to the ether oxygen atom. I have also found that the reaction is promoted by stable polyethers which are liquids at the desired working temperatures, for example at temperatures up to 200° C.

I have now discovered that certain dialkylamino derivatives of the above mentioned ethers also are effective as solvent media for promoting these addition reactions. These dialkylamino ethers which promote the reaction are those in which the alkyl radicals in the dialkylamino groups contain not more than three carbon atoms each, for example, the dimethyl-, diethyl-, methyl propyl- and dipropylamino derivatives of the aforesaid ethers. The dialkylamino group may occupy any position in the ether molecule, providing that there is not more than two carbon atoms between the amino nitrogen atom and the ether oxygen atom. In other words, the tertiary amino ether must contain the grouping:

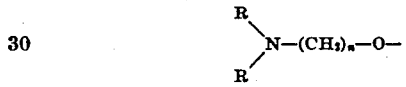

where R is an alkyl group containing not more than three carbon atoms and $n$ is the integer 1 or the integer 2. Examples of such suitable amino ethers are:

(CH₃)₂N—CH₂—O—CH₃ (Dimethylamino dimethyl ether)

(CH₃)₂N—C₂H₄—O—CH₃ (Dimethylaminoethyl methyl ether)

(C₂H₅)₂N—C₂H₄—O—CH₃ (Diethylaminoethyl methyl ether)

(CH₃)₂N—C₂H₄—O—C₂H₄—O—C₂H₅ (Dimethylaminoethyl ethyl ether of ethylene glycol)

(CH₃)₂N—C₂H₄—O—C₂H₄—O—C₂H₄—N(CH₃)₂ (Dimethylaminoethyl diether of ethylene glycol)

HC≡(O—CH₂—N(CH₃)₂)₃ (Tri (dimethylaminomethyl) ester of orthoformic acid)

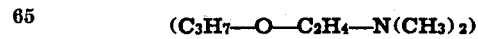

(Diethylamino dioxan)

I have further discovered that still other ethers containing one or more tertiary amino groups are effective in promoting the herein described addition reactions. For example, dialkylamino derivatives (where the alkyl radical is not higher than C₃H₇) of certain ethers will promote the addition reactions, whereas the parent ethers themselves are ineffective. For example, diethyl ether has substantially no effect in promoting the rapid addition of sodium to naphthalene; but this reaction occurs readily in beta-dimethylamino diethyl ether (C₂H₅—O—C₂H₄—N(CH₃)₂). Also, ethyl propyl ether is ineffective, while beta-dimethylaminoethyl propyl ether (C₃H₇—O—C₂H₄—N(CH₃)₂)

will promote the reaction. The rule stated above, namely that there may not be more than two carbon atoms between the nitrogen and oxygen atoms also holds for these ethers; thus the ether (CH₃)₂N—C₃H₆—O—C₂H₅, which has more than two carbon atoms between the nitrogen and oxygen atoms lies outside of the group of ethers effective as solvents in the present invention. Also, if the ether is a monoether, it must not contain more than seven carbon atoms, including the carbon atoms in any dialkylamino groups. If the ether is a polyether, either cyclic or non-cyclic, the ratio of the total carbon atoms to the sum of the ether oxygen and amino nitrogen atoms present must be not greater than 5:1.

The ethers employed as solvent media in accordance with the present invention should be substantially inert towards the alkali metals and the addition compounds formed. For this reason, I exclude from the amino ethers used those which contain primary or secondary amino groups, since they tend to react with alkali metals to liberate hydrogen or with the addition compounds to form hydrogenated hydrocarbons.

I have found that various inert materials, e. g. hydrocarbons or ethers, which do not react with alkali metals and which themselves may not be suitable as solvents for the reaction, may be used as diluting agents for my effective tertiary amine solvents. The effect of thus diluting the amine ether solvent generally is to decrease the rate of the addition reaction; thus the rate of reaction may be varied as desired by the amount of dilution. Generally, as the concentration of the amine ether is decreased, a minimum concentration is reached, below which the amine ether tends to have little or no reaction promoting effect. This minimum point, which will vary for different amine ethers and also with reaction conditions, such as temperature, may readily be determined by simple experiments. Also, the tertiary amine ether solvents may be mixed with other materials which in themselves are suitable solvents for the reaction, e. g., with the ether solvents described and claimed in U. S. Patents 2,019,832, 2,023,793 and 2,027,000.

I have discovered that alkali metals can be added not only to naphthalene but also to other polycyclic aromatic hydrocarbons by the method of my herein described invention. For example, alkali metal addition compounds of anthracene, phenanthrene, acenaphthene, diphenyl, dinaphthyl, retenne and the like may thus be produced in good yields. The alkali-metal hydrocarbon compound obtained in a tertiary amine solution solvent by the present invention is substantially identical in its chemical nature with those obtained with ether solvents as described in the above mentioned U. S. patents. The amine ether solutions of alkali metal addition compounds of polycyclic aromatic hydrocarbons obtained by the method of the present invention readily undergo reaction with the various reagents which react with alkali metals. For example water, alcohol or other substances which form substitution compounds of alkali metals will react with these solutions to form hydrogenated hydrocarbons; thus the sodium addition compound of naphthalene reacts with water, etc. to form dihydronaphthalene. Likewise, these solutions react readily with carbon dioxide to form carboxy acids; for example, the sodium-naphthalene addition compound forms the disodium salt of dihydronaphthalene dicarboxy acid, which salt on hydrolysis with an acid yields the free dicarboxy acid. The reactive amine ether solutions of the addition compounds may be used in place of the free alkali metals for a number of chemical syntheses and for other uses, e. g., refining hydrocarbons and as polymerization catalysts for polymerizing unsaturated hydrocarbons. These reactive solutions are stable and may be stored and transported without change if care is taken to protect them from contact with reactive substances such as moisture and carbon dioxide.

The following example is given by way of illustration:—

Example

One part naphthalene was dissolved in about two parts of beta-diethylaminoethyl methyl ether under an atmosphere of nitrogen in a closed vessel equipped with a stirrer. After this, about 0.2 part of sodium was added in small chips and the mixture was agitated for two hours. Carboxylation of the resulting green sodium naphthalene solution at —20° C., followed by filtration, gave a good yield of the sodium salts of isomeric dihydronaphthalene discarboxylic acids.

In carrying out these reactions, I have found it to be of importance to have the surfaces of the sodium clean. Thus the solvent should be purified of such materials as will react with sodium and tend to form insoluble coatings thereon, under the conditions to be used, and the sodium should be protected from contact with such reactive materials from the time it is mechanically subdivided. Extreme fineness of sodium is not required although the rate will be dependent, among other things, on the extent of sodium surface, and this affords one means of controlling the rate. The naphthalene need not be of extreme purity. Technical flake naphthalene works quite satisfactorily. The complete absence of all sulfur compounds is not essential as shown by the fact that dimethyl sulfide can be used as an inert diluent in the reaction medium for the reaction of sodium with naphthalene. The presence of free $CO_2$ dissolved in the solvent in excessive amounts is likely to interfere with the reaction of sodium with naphthalene starting because of coating the sodium surface with carbonate. On the other hand, when the reaction is well started, dry carbon dioxide then can be introduced and the carboxylation carried on simultaneously, as long as care is taken that the rate of carbon dioxide addition is insufficient to destroy completely all the green color of the sodium hydrocarbon addition compound which will continue to be formed by the reaction of additional sodium present.

I claim:

1. A method of effecting the addition of an alkali metal to a polycyclic aromatic hydrocarbon which comprises reacting the alkali metal and said hydrocarbon in a reaction medium comprising a dialkylamino aliphatic mono ether containing not more than 7 carbon atoms, having a chain of not more than two carbon atoms between the oxygen atom and any nitrogen atom and having no alkyl attached to the ether oxygen atom which contains more than 2 carbon atoms, the alkyl radicals of any dialkyl amino group in said ether containing not more than 3 carbon atoms each, in sufficient amount to promote the reaction.

2. A method of effecting the addition of sodium to naphthalene which comprises reacting the sodium and naphthalene in a reaction medium comprising a dialkylamino aliphatic mono ether containing not more than 7 carbon atoms having a chain of not more than two carbon atoms between the oxygen atom and any nitrogen atom, and having no alkyl attached to the ether oxygen atom which contains more than 2 carbon atoms, the alkyl radicals of any dialkyl amino group in said ether containing not more than 3 carbon atoms each, in sufficient amount to promote the reaction.

3. A method of effecting the addition of sodium to a polycyclic aromatic hydrocarbon which comprises reacting the sodium and said hydrocarbon in a reaction medium comprising a dialkylaminoethyl alkyl mono ether containing not more than 7 carbon atoms and having an alkoxy group containing not more than 2 carbon atoms, in sufficient amount to promote the reaction.

4. A method of effecting the addition of sodium to naphthalene which comprises reacting the sodium and naphthalene in a reaction medium comprising a dialkylaminoethyl alkyl mono ether containing not more than 7 carbon atoms, having an alkoxy group containing not more than 2 carbon atoms, in sufficient amount to promote the reaction.

5. A method of effecting the addition of sodium to a polycyclic aromatic hydrocarbon which comprises reacting the sodium and said hydrocarbon in a reaction medium comprising a polyether derived from a polyhydric alcohol, having all the hydroxyl hydrogen atoms replaced by alkyl groups, said ether containing at least one dialkylamino group in which the alkyl groups contain not more than 3 carbon atoms each, in sufficient amount to promote the reaction.

6. A method of effecting the addition of sodium to naphthalene which comprises reacting the sodium and naphthalene in a reaction medium comprising a polyether derived from a polyhydric alcohol, having all the hydroxyl hydrogen atoms replaced by alkyl groups, said ether containing at least one dialkylamino group in which the alkyl groups contain not more than 3 carbon atoms each, in sufficient amount to promote reaction.

7. A method of effecting the addition of sodium to naphthalene which comprises reacting the sodium and naphthalene in a reaction medium comprising a glycol diether containing at least one dialkylamino group in which the alkyl groups contain not more than 3 carbon atoms each, in sufficient amount to promote the reaction.

8. A method of effecting the addition of sodium to naphthalene which comprises reacting the sodium and naphthalene in a reaction medium comprising a glycerol triether containing at least one dialkylamino group in which the alkyl groups contain not more than 3 carbon atoms each, in sufficient amount to promote the reaction.

9. A method of effecting the addition of sodium to naphthalene which comprises reacting the sodium and naphthalene in a reaction medium comprising an ether having a carbon to oxygen ratio not greater than 4:1 and in which there is a $CH_3O$ group if the ether is aliphatic and having no aryl group attached to the ether oxygen atom if the ether is a mono ether, said ether having at least one hydrogen atom substituted by a dialkylamino group in which the alkyl radicals contain not more than 3 carbon atoms each, which ether is inert both to the reagents and the products under the conditions of the reactions, in sufficient amount to promote the reaction.

10. A method of effecting the addition of sodium to naphthalene which comprises reacting the sodium and naphthalene in a reaction medium comprising a monoether having a carbon to oxygen ratio not greater than 4:1 which contains a $CH_3O$- group, at least one hydrogen atom of said ether being substituted by a dialkylamino group in which the alkyl radicals contain not more than 3 carbon atoms each, which ether is inert both to the reagents and the products under the conditions of the reaction, in sufficient amount to promote the reaction.

11. A method of effecting the addition of sodium to naphthalene which comprises reacting the sodium and naphthalene in a reaction medium comprising a dialkylamino methyl ether of an aliphatic alcohol containing not more than 3 carbon atoms, which ether contains at least one dialkylamino group in which the alkyl radicals contain not more than 3 carbon atoms each, in sufficient amount to promote the reaction.

12. A method of effecting the addition of sodium to naphthalene which comprises reacting the sodium and naphthalene in a reaction medium comprising dimethylamino dimethyl ether, in sufficient amount to promote the reaction.

13. A method of effecting the addition of sodium to naphthalene which comprises reacting the sodium and naphthalene in a reaction medium comprising dimethylaminoethyl diether of ethylene glycol, in sufficient amount to promote the reaction.

14. A method of effecting the addition of an alkali metal to a polycyclic aromatic hydrocarbon which comprises reacting the alkali metal and said hydrocarbon in a medium comprising, in an amount sufficient to promote the reaction, an aliphatic tertiary amino ether selected from the group consisting of monoethers having not more than 7 carbon atoms and polyethers in which the ratio of carbon atoms to the sum of nitrogen and oxygen atoms is not greater than 5:1, said ether containing at least one group represented by the formula

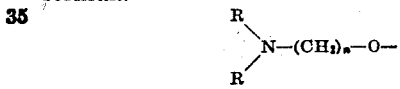

wherein R represents an alkyl group and $n$ represents the integer 1 or 2, each alkyl group in said ether having not more than 3 carbon atoms and any alkylene group not attached to a nitrogen atom in said ether having not more than 3 carbon atoms, said ether being substantially chemically inert to alkali metals and organic alkali metal addition compounds.

15. A method of effecting the addition of sodium to naphthalene which comprises reacting sodium and naphthalene in a medium which comprises, in an amount sufficient to promote the reaction, an aliphatic tertiary amino ether selected from the group consisting of mono ethers having not more than 7 carbon atoms and poly ethers in which the ratio of carbon atoms to the sum of nitrogen and oxygen atoms is not greater than 5:1, said ether containing at least one group represented by the formula

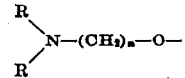

wherein R represents an alkyl group and $n$ represents the integer 1 or 2, each alkyl group in said ether having not more than 3 carbon atoms and any alkylene group not attached to a nitrogen atom in said ether having not more than 3 carbon atoms, said ether being substantially chemically inert to alkali metals and organic alkali metal addition compounds.

16. A method of effecting the addition of an alkali metal to a polycyclic aromatic hydrocarbon which comprises reacting the alkali metal and said hydrocarbon in a reaction medium comprising, in an amount sufficient to promote the reaction, an aliphatic ether selected from the group consisting of mono ethers having not more than 7 carbon atoms and poly ethers in which the ratio of carbon atoms to the sum of the oxygen and nitrogen atoms is not greater than 5:1, said ether having at least one tertiary amino group but no primary amino group and no secondary amino group, with not more than two carbon atoms between each tertiary nitrogen atom and the adjacent ether oxygen atoms, each alkyl group in said ether having not more than 3 carbon atoms and each alkylene group not attached to a nitrogen atom having not more than 3 carbon atoms, said ether being substantially unreactive towards alkali metal and alkali metal addition compounds.

17. A method of effecting the addition of an alkali metal to a polycyclic aromatic hydrocarbon which comprises reacting the alkali metal with said hydrocarbon in a medium comprising, in an amount sufficient to promote the reaction, an aliphatic tertiary amino ether having the formula

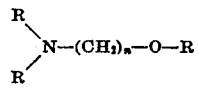

wherein R represents an alkyl group having not more than 3 carbon atoms and $n$ represents the integer 1 or 2, said ether having a total of not more than 7 carbon atoms and being substantially unreactive towards alkali metal and alkali metal addition compounds.

JOSEPH F. WALKER.